(12) United States Patent
Ostermann et al.

(10) Patent No.: US 7,379,066 B1
(45) Date of Patent: *May 27, 2008

(54) SYSTEM AND METHOD OF CUSTOMIZING ANIMATED ENTITIES FOR USE IN A MULTI-MEDIA COMMUNICATION APPLICATION

(75) Inventors: Joern Ostermann, Morganville, NJ (US); Mehmet Reha Civanlar, Middletown, NJ (US); Ana Cristina Andres del Valle, Barcelona (ES); Patrick Haffner, Atlantic Heighlands, NJ (US)

(73) Assignee: AT&T Corp., New York, NY (US)

( * ) Notice: Subject to any disclaimer, the term of this patent is extended or adjusted under 35 U.S.C. 154(b) by 13 days.

This patent is subject to a terminal disclaimer.

(21) Appl. No.: 11/420,610

(22) Filed: May 26, 2006

Related U.S. Application Data

(63) Continuation of application No. 10/001,120, filed on Nov. 2, 2001, now Pat. No. 7,091,976.

(60) Provisional application No. 60/245,521, filed on Nov. 3, 2000.

(51) Int. Cl.
*G06T 13/00* (2006.01)

(52) U.S. Cl. ...................... 345/473; 345/629

(58) Field of Classification Search ............... 345/473, 345/629
See application file for complete search history.

(56) References Cited

U.S. PATENT DOCUMENTS

| | | | |
|---|---|---|---|
| 4,276,570 A | 6/1981 | Burson et al. | |
| 4,602,280 A | 7/1986 | Maloomian | |
| 5,113,493 A | 5/1992 | Grosby | |
| 5,347,306 A | 9/1994 | Nitta | |
| 5,387,178 A | 2/1995 | Moses | |
| 5,416,899 A | 5/1995 | Poggio et al. | |

(Continued)

FOREIGN PATENT DOCUMENTS

EP 849691 A2 6/1998

(Continued)

OTHER PUBLICATIONS

Decarlo et al.,"An anthropometric face model using variational techniques", In Proc. of 25th Annl Conf. on Computer Graphics & interactive Tech.Siggraph 98, ACM Press, NY,67-74.

(Continued)

*Primary Examiner*—Kimbinh T. Nugyen

(57) ABSTRACT

In an embodiment, a method is provided for creating a personal animated entity for delivering a multi-media message from a sender to a recipient. An image file from the sender may be received by a server. The image file may include an image of an entity. The sender may be requested to provide input with respect to facial features of the image of the entity in preparation for animating the image of the entity. After the sender provides the input with respect to the facial features of the image of the entity, the image of the entity may be presented as a personal animated entity to the sender to preview. Upon approval of the preview from the sender, the image of the entity may be presented as a sender-selectable personal animated entity for delivering the multi-media message to the recipient.

13 Claims, 8 Drawing Sheets

U.S. PATENT DOCUMENTS

| | | |
|---|---|---|
| 5,420,801 A | 5/1995 | Dockter et al. |
| 5,537,662 A | 7/1996 | Sato et al. |
| 5,546,500 A | 8/1996 | Lyberg |
| 5,555,343 A | 9/1996 | Luther |
| 5,555,426 A | 9/1996 | Johnson et al. |
| 5,638,502 A | 6/1997 | Murata |
| 5,640,590 A | 6/1997 | Luther |
| 5,647,834 A | 7/1997 | Ron |
| 5,657,426 A | 8/1997 | Waters et al. |
| 5,659,692 A | 8/1997 | Poggio et al. |
| 5,680,481 A | 10/1997 | Prasad et al. |
| 5,689,618 A | 11/1997 | Gasper et al. |
| 5,697,789 A | 12/1997 | Sameth et al. |
| 5,732,232 A | 3/1998 | Brush et al. |
| 5,745,360 A | 4/1998 | Leone et al. |
| 5,781,186 A | 7/1998 | Jennings |
| 5,818,461 A | 10/1998 | Rouet et al. |
| 5,826,234 A | 10/1998 | Lyberg |
| 5,832,115 A | 11/1998 | Rosenberg |
| 5,850,463 A | 12/1998 | Horii |
| 5,852,669 A | 12/1998 | Eleftheriadis et al. |
| 5,857,099 A | 1/1999 | Mitchell et al. |
| 5,860,064 A | 1/1999 | Henton |
| 5,880,731 A | 3/1999 | Liles et al. |
| 5,889,892 A | 3/1999 | Saito |
| 5,933,151 A | 8/1999 | Jayant et al. |
| 5,936,628 A | 8/1999 | Kitamura et al. |
| 5,950,163 A | 9/1999 | Matsumoto |
| 5,963,217 A | 10/1999 | Grayson |
| 5,970,173 A | 10/1999 | Lee et al. |
| 5,970,453 A | 10/1999 | Sharman |
| 5,982,853 A | 11/1999 | Liebermann |
| 5,983,190 A | 11/1999 | Trower et al. |
| 5,995,119 A | 11/1999 | Cosatto et al. |
| 5,995,639 A | 11/1999 | Kado et al. |
| 6,002,997 A | 12/1999 | Tou |
| 6,011,537 A | 1/2000 | Slotznick |
| 6,014,689 A | 1/2000 | Budge et al. |
| 6,018,744 A | 1/2000 | Mamiya et al. |
| 6,064,383 A | 5/2000 | Skelly |
| 6,075,857 A | 6/2000 | Doss et al. |
| 6,075,905 A | 6/2000 | Herman et al. |
| 6,078,700 A | 6/2000 | Sarachik |
| 6,088,040 A | 7/2000 | Oda et al. |
| 6,111,590 A | 8/2000 | Boezeman et al. |
| 6,122,177 A | 9/2000 | Kitano |
| 6,122,606 A | 9/2000 | Johnson |
| 6,147,692 A | 11/2000 | Shaw et al. |
| 6,161,082 A | 12/2000 | Goldberg et al. |
| 6,166,744 A | 12/2000 | Jaszlics et al. |
| 6,173,250 B1 | 1/2001 | Jong |
| 6,195,631 B1 | 2/2001 | Alshawi et al. |
| 6,208,359 B1 | 3/2001 | Yamamoto |
| 6,215,505 B1 | 4/2001 | Minami et al. |
| 6,219,638 B1 | 4/2001 | Padmanabhan et al. |
| 6,225,978 B1 | 5/2001 | McNeil |
| 6,230,111 B1 | 5/2001 | Mizokawa |
| 6,232,966 B1 | 5/2001 | Kurlander |
| 6,233,544 B1 | 5/2001 | Alshawi |
| 6,243,681 B1 | 6/2001 | Guji et al. |
| 6,289,085 B1 | 9/2001 | Miyashita et al. |
| 6,307,567 B1 | 10/2001 | Cohen-Or |
| 6,329,994 B1 | 12/2001 | Gever et al. |
| 6,332,038 B1 | 12/2001 | Funayama et al. |
| 6,343,141 B1 | 1/2002 | Okada et al. |
| 6,366,286 B1 | 4/2002 | Hermanson |
| 6,366,949 B1 | 4/2002 | Hubert |
| 6,377,925 B1 | 4/2002 | Greene et al. |
| 6,381,346 B1 | 4/2002 | Eraslan |
| 6,384,829 B1 | 5/2002 | Prevost et al. |
| 6,385,586 B1 | 5/2002 | Dietz |
| 6,393,107 B1 | 5/2002 | Ball et al. |
| 6,405,225 B1 | 6/2002 | Apfel et al. |
| 6,417,853 B1 | 7/2002 | Squires et al. |
| 6,433,784 B1 | 8/2002 | Merrick et al. |
| 6,434,597 B1 | 8/2002 | Hachiya et al. |
| 6,449,634 B1 | 9/2002 | Capiel |
| 6,453,294 B1 | 9/2002 | Dutta et al. |
| 6,460,075 B2 | 10/2002 | Krueger et al. |
| 6,462,742 B1 | 10/2002 | Rose et al. |
| 6,466,205 B2 | 10/2002 | Simpson et al. |
| 6,466,213 B2 | 10/2002 | Bickmore et al. |
| 6,476,815 B1 | 11/2002 | Ando |
| 6,496,868 B2 | 12/2002 | Krueger et al. |
| 6,522,333 B1 | 2/2003 | Hatlelid et al. |
| 6,532,011 B1 | 3/2003 | Francini et al. |
| 6,535,907 B1 | 3/2003 | Hachiya et al. |
| 6,539,354 B1 | 3/2003 | Sutton et al. |
| 6,542,936 B1 | 4/2003 | Mayle et al. |
| 6,545,682 B1 | 4/2003 | Ventrella et al. |
| 6,553,341 B1 | 4/2003 | Mullaly et al. |
| 6,606,096 B2 | 8/2003 | Wang |
| 6,631,399 B1 | 10/2003 | Stanczak et al. |
| 6,643,385 B1 | 11/2003 | Bravomalo |
| 6,654,018 B1 | 11/2003 | Cosatto et al. |
| 6,665,860 B1 | 12/2003 | DeSantis et al. |
| 6,680,934 B1 | 1/2004 | Cain |
| 6,692,359 B1 | 2/2004 | Williams et al. |
| 6,766,299 B1 | 7/2004 | Bellomo et al. |
| 6,782,431 B1 | 8/2004 | Mukherjee et al. |
| 6,784,901 B1 | 8/2004 | Harvey et al. |
| 6,801,931 B1 | 10/2004 | Ramesh et al. |
| 6,833,845 B2 | 12/2004 | Kitagawa et al. |
| 6,919,892 B1 | 7/2005 | Cheiky et al. |
| 6,963,839 B1 | 11/2005 | Ostermann et al. |
| 6,987,535 B1 | 1/2006 | Matsugu et al. |
| 6,990,452 B1 | 1/2006 | Ostermann et al. |
| 7,177,811 B1 | 2/2007 | Ostermann et al. |
| 7,203,648 B1 | 4/2007 | Ostermann et al. |
| 7,203,759 B1 | 4/2007 | Ostermann et al. |
| 2001/0019330 A1 | 9/2001 | Bickmore et al. |
| 2001/0049596 A1 | 12/2001 | Lavine et al. |
| 2001/0050681 A1 | 12/2001 | Keys et al. |
| 2001/0050689 A1 | 12/2001 | Park |
| 2002/0007276 A1 | 1/2002 | Rosenblatt et al. |
| 2002/0109680 A1 | 8/2002 | Orbanes et al. |
| 2002/0176604 A1 | 11/2002 | Shekhar et al. |
| 2002/0194006 A1 | 12/2002 | Challapall |
| 2003/0028378 A1 | 2/2003 | August et al. |
| 2003/0035412 A1 | 2/2003 | Wang et al. |
| 2003/0046160 A1 | 3/2003 | Paz-Pujalt et al. |
| 2003/0048348 A1 | 3/2003 | Pinto et al. |
| 2003/0191816 A1 | 10/2003 | Landress et al. |
| 2004/0091154 A1 | 5/2004 | Cote |
| 2005/0091305 A1 | 4/2005 | Lange et al. |

FOREIGN PATENT DOCUMENTS

| | | |
|---|---|---|
| EP | 849692 A2 | 6/1998 |
| JP | 2003033575 A | 2/2003 |
| KR | 2002016482 A | 3/2002 |

OTHER PUBLICATIONS

Jian-Gang Wang et al."Morphology-based front-view facial contour detection", IEEE Int'l Conf on Systems, Man and Cybernetics, vol. 4, Oct. 2000, pp. 2775-2780.

Shinn-Yin Ho et al,"Facial Modelling fr. an uncalibrated face image using flexible generic parameterized facial models", IEEE Trans. on Systems, Man, & Cybernetics, Pt B, V.31.

Noh, J. et al,"Expression cloning", In Proc.of 28th Annual Conf. on Computer Graphics and interactive Techniques, SIGGRAPH 01, ACM Press, NY, NY p. 277-288.

Litwinowicz, et al "Animating images with drawings" Proc 21st Annual Conf. on Computer Graphics & interactive Tech. SIGGRAPH 1994, ACM Press, NY, NY 409-412.

Yoo, et al "Concept formation in numeric domains" Proc.1995 ACM 23rd Annual Conf. on Computer Science, ACM Press, NY, NY, 36-41.

E. Cosatto, et al "Photo-realistic Talking-heads from Image Samples", IEEE Transactions on Multimedia, Dept. 2000, vol. 2, issue 3, pp. 152-163.

Stephane Dupont, et al "Audio-Visual Speech Modeling for Continuous Speech Recognition" IEEE Trans. On Multimedia, vol. 2, No. 3, Sep. 2000.

K-S. Lee, et al "TTS Based Very Low Bit Rate Speech Coder", Proc. ICASSP 1999, vol. 1, Mar. 1999, pp. 181-184.

R. Sproat, et al "Emu: An E-mail Preprocessor for Text-to-Speech", IEEE Signal Processing Society 1998 Workshop on Multimedia Signal Processing, Dec. 7-9, 1998, Los Angeles, CA, USA.

Mikio Kitai et al "Trends of ASR and TTS Applications in Japan", Proc. Of International Workshop on Interactive Voice Technology for Telecommunications Applications (IVTTA96), Sep. 1996.

D. Kurlander, et al "Comic Chat", Proceedings of the 23$^{rd}$ Annual Conference on Computer Graphic and Interactive Techniques, Aug. 1996.

Pollack "Happy in the East or Smiling in the West", New York Times, Aug. 12, 1996.

Pelachaud, et al "Generating Facial Expression for Speech", Cognitive Science, Jan. 3, 1996, vol. 20, No. 1, pp. 1-46.

W. Keith Edwards, "The Design and Implementation of the Montage Multimedia Mail System", Apr. 1991, IEEE Conference Proceedings of TRICOMM '91, pp. 47-57.

Ming Ouhyoung, et al "Web-enabled Speech Driven Facial Animation", Proc. Of ICAT'99 (Int'l Conference on Artifical Reality and Tele-existance), pp. 23-28, Dec. 1999, Tokyo, Japan.

H. Noot, et al Chartoon 20.0 Manual, Jan. 31, 2000.

Lijun Yin, et al "MPEG4 face modeling using fiducial points", IEEE; Image Processing, 1997. Proceedings., International Conference on, vol. 1, 26-29. 1997.

Bickmore, et al "Animated Autonomous Personal Representatives", ACM, International Conference on Autonomous Agents, Proceedings of the Second International Conference on Autonomous Agents, pp. 8-15, 1998.

Thorisson, Kristinn R. "ToonFace: A System for Creating and Animating Interactive Cartoon Faces." MIT Media Laboratory Learning and Common Sense Section Technical Report, pp. 96-101, Apr. 1996.

Naka, T., et al., "A compression/decompression method for streaming based humanoid animation", Proceedings of Fourth Symposium on Virtual Reality Modeling Language, Feb. 23-26, 1999, VRML '99, ACM Press, NY, NY, pp. 63-70.

Perlin, K. et al., "Improv: a system for scripting interactive actors in virtual worlds", Proceedings of the 23$^{rd}$ Annual Conference on Computer Graphics and interactive Techniques, SIGGRAPH '96, ACM Press, NY, NY, pp. 205-216.

Pighin, F., et al., "Synthesizing realistic facial expressions from photographs", Proceedings of the 25$^{th}$ Annual Conference on Computer Graphics and interactive Techniques, SIGGRAPH '96, ACM Press, NY, NY, pp. 75-84.

Marks et al., "Fuzzy and extra crisp alternating projection onto convex sets (POCS)", Proceedings IEEE International Conference on Fuzzy Systems, vol. 2, Mar. 20-24, 1995, pp. 427-435 vol. 2.

Zs. Ruttkay, P. ten Hagen, H. Noot, and M. Savenije, Facial animation by synthesis of captured and artificial data, CAPtech '98 proceedings, 1998.

J. Hendrix, et al., "A facial repertoire for avatars", Proceedings of the Workshop "Interacting Agents", Enschede, The Netherlands, 2000, pp. 1-20.

Chua, C; Neumann, U., "A layered approach to deformable modeling and animation", Proceedings of the Fourteenth Conference on Computer Animation, Nov. 7-8, 2001, pp. 184-191.

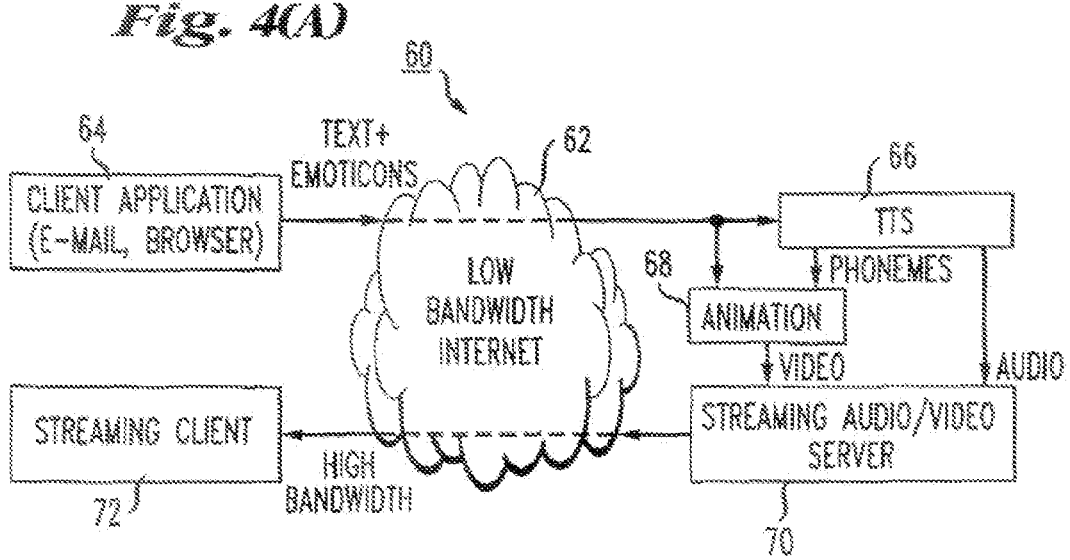
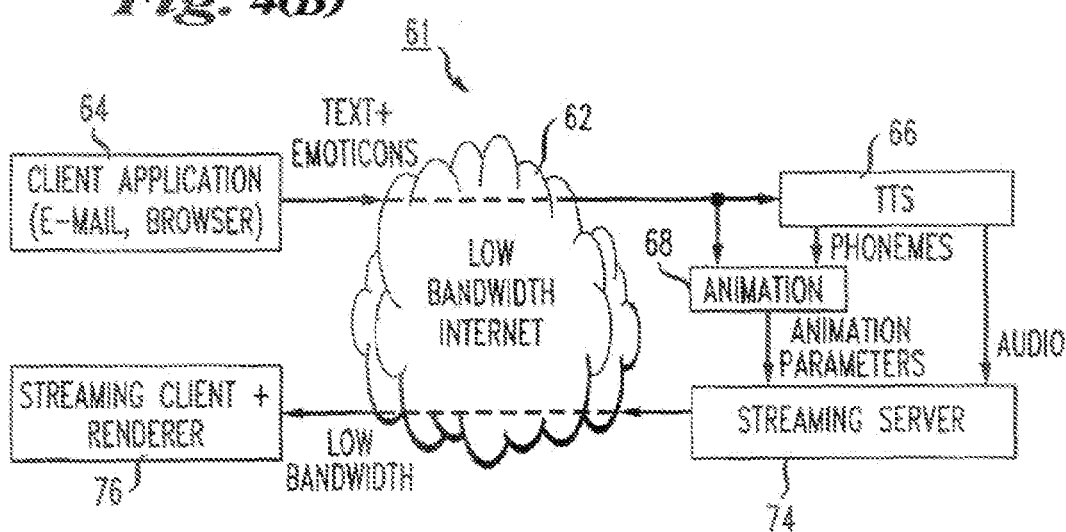
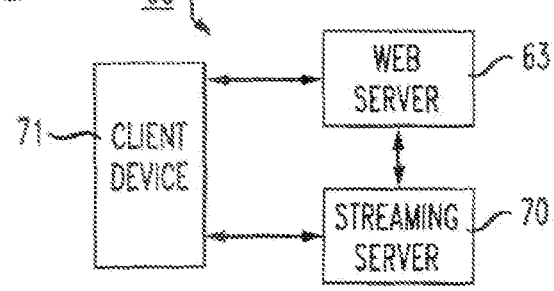

FIG. 6

SYSTEM AND METHOD OF CUSTOMIZING ANIMATED ENTITIES FOR USE IN A MULTI-MEDIA COMMUNICATION APPLICATION

PRIORITY APPLICATIONS

The present application is a continuation application of non-provisional U.S. patent application No. 10/001,120, filed Nov. 2, 2001, which claims priority to provisional U.S. patent application No. 60/245,521, filed Nov. 3, 2000. The contents of both non-provisional U.S. patent application No. 10/001,120 and provisional U.S. patent application No. 60/245,521 are incorporated herein by reference in their entireties.

RELATED APPLICATIONS

The present application is related to the following U.S. patent applications: Ser. No. 10/002,094 entitled "System and Method for Sending Multi-Media Message With Customized Audio"; Ser. No. 10/093,091 entitled "System and Method for Receiving Multi-Media Messages"; Ser. No. 10/003,350 entitled "System and Method for Sending Multi Media messages Using Emoticons"; Ser. No. 10/003,093 entitled "System and Method for Sending Multi-Media Messages Using Customizable Background Images"; Ser. No. 09/999,526 entitled "System and Method of Controlling Sound in a Multi-Media Communication Application"; Ser. No. 09/999,525 entitled "System and Method of Marketing Using a Multi-Media Communication System"; and Ser. No. 09/999,505 entitled "System and Method of Providing Multi-Cultural Multi-Media Messages." These applications, filed concurrently herewith and commonly assigned, are incorporated herein by reference.

BACKGROUND OF THE INVENTION

1. Field of the Invention

The present invention relates to multi-media messages and more specifically to a system and method of customizing the creation and sending of multi-media messages.

2. Discussion of Related Art

There is a growing popularity for text-to-speech ("TTS") enabled systems that combine voice with a "Talking head" or a computer-generated face that literally speaks to a person. Such systems improve user experience with a computer system by personalizing the exchange of information. Systems for converting text into speech are known in the art. For example, U.S. Pat. No. 6,173,263 to Alistair Cookie, assigned to the assignee of the present invention, discloses a system and method of performing concatenative speech synthesis. The contents of this patent are incorporated herein by reference.

One example associated with the creation and delivery of e-mails using a TTS system is LifeFX™s facemail™. FIG. 1 illustrates how a sender creates a message using the LifeFX™, system. A window 10 presents fields for inserting the sender's e-mail address 12 and the recipient's e-mail address 14. Standard features such as control buttons 16 for previewing and delivering the messages are provided. A standard subject line is also provided 18. The sender chooses from a variety of faces 20 to deliver the message. The currently chosen face 22 appears in the window 10 as well. The sender inserts the message text as with a traditional e-mail in a text area 24 and a box 26 below the text area gives illustrations of some of the available emotions, explained further below.

This system enables a sender to write an e-mail and choose a talking head or "face" to deliver the e-mail. The recipient of the e-mail needs to download special TTS software in order to enable the "face" to deliver the message. The downloaded software converts the typewritten e-mail from the e-mail sender into audible words, and synchronizes the head and mouth movements of the talking head to match the audibly spoken words. Various algorithms and software may be used to provide the TTS function as well as the synchronization of the speech with the talking head. For example, the article, "Photo-realistic Talking-heads From Image Samples," by E. Cosatto and H. P. Graf, *IEEE Transactions on Multimedia,* September 2000, Vol. 2, Issue 3, pages 152–163, describes a system for creating a realistic model of a head that can be animated and lip-synched from phonetic transcripts of text. The contents of this article are incorporated herein by reference. Such systems, when combined with TTS synthesizers, generate video animations of talking heads that resemble people. One drawback of related systems is that the synthesized voice bears no resemblance to the sender voice.

The LifeFX™ system presents the user with a plurality of faces 20 from which to choose. Once a face is chosen, the e-mail sender composes an e-mail message. Within the e-mail, the sender inserts features to increase the emotion showed by the computer-generated face when the e-mail is "read" to the e-mail recipient. For example, the following will result in the message being read with a smile at the end: "Hi, how are you today? :-)". These indicators of emotion are called "emoticons" and may include such features as: :-( (frown); -o (wow); :-x (kiss); and ;-) (wink). The e-mail sender will type in these symbols which are translated by the system into the emotions. Therefore, after composing a message, inserting emotions, and choosing a face, the sender sends the message. The recipient will get an e-mail with a notification that he or she has received a facemail and that they will need to download a player to hear the message.

The LifeFX™ system presents its emoticons when delivering the message in a particular way. For example, when an emoticon such as a smile is inserted in the sentence "Hi, Jonathon, :-) how are you today?" the "talking head" 22 speaks the words "Hi, Jonathan" and then stops talking and begins the smiling operation. After finishing the smile, the talking head completes the sentence "how are you today?"

The LifeFX™ system only enables the recipient to hear the message after downloading the appropriate software. There are several disadvantages to delivering multi-media messages in this manner. Such software requires a large amount of disc space and the recipient may not desire to utilize his or her space with the necessary software. Further, with viruses prevalent on the Internet, many people are naturally reluctant to downward software when they are unfamiliar with its source.

FIG. 2 illustrates a received facemail™ 40. The chosen talking head 22 delivers the message. Buttons such as "say again" 42, "new" 44, "forward" 26, "reply" 48, "reply all" 50, and "show text" 52 enable the recipient to control to some degree how the message is received. Buttons 42, 44, 46, 48 and 50 are commonly used button features for controlling messages. Button 52 allows the user to read the text of the message. When button 52 is clicked, the text of the message is shown in a window illustrated in FIG. 3. A separate window 54 pops up typically over the talking head 22 with the text. When the window is moved or does not cover the talking head, the sound continues but if the mouth of the talking head is showing, it is clear that when the text box is up, the mouth stops moving.

SUMMARY OF THE INVENTION

What is needed in the art is a system and method of enabling a sender to create an animated entity of his or her choice for use in a multi-media message. In an embodiment, a method is provided for creating a personal animated entity for delivering a multi-media message from a sender to a recipient. An image file from the sender may be received by a server. The image file may include an image of an entity. The sender may be requested to provide input with respect to facial features of the image of the entity in preparation for animating the image of the entity. After the sender provides the input with respect to the facial features of the image of the entity, the image of the entity may be presented as a personal animated entity to the sender to preview. Upon approval of the preview from the sender, the image of the entity may be presented as a sender-selectable personal animated entity for delivering the multi-media message to the recipient.

BRIEF DESCRIPTION OF THE DRAWINGS

The foregoing advantages of the present invention will be apparent from the following detailed description of several embodiments of the invention with reference to the corresponding accompanying drawings, of which:

FIG. 4(a) illustrates the basic architecture of the system according to an embodiment of the present invention;

FIG. 4(b) illustrates a low bandwidth version of the system shown in FIG. 4(a);

FIG. 5 shows example architecture for delivering the multi-media message;

FIG. 6 shows an example multi-media message creation window with a configuration to enable a sender to chose options for creating a multi-media message;

DETAILED DESCRIPTION OF THE INVENTION

Figure 1:
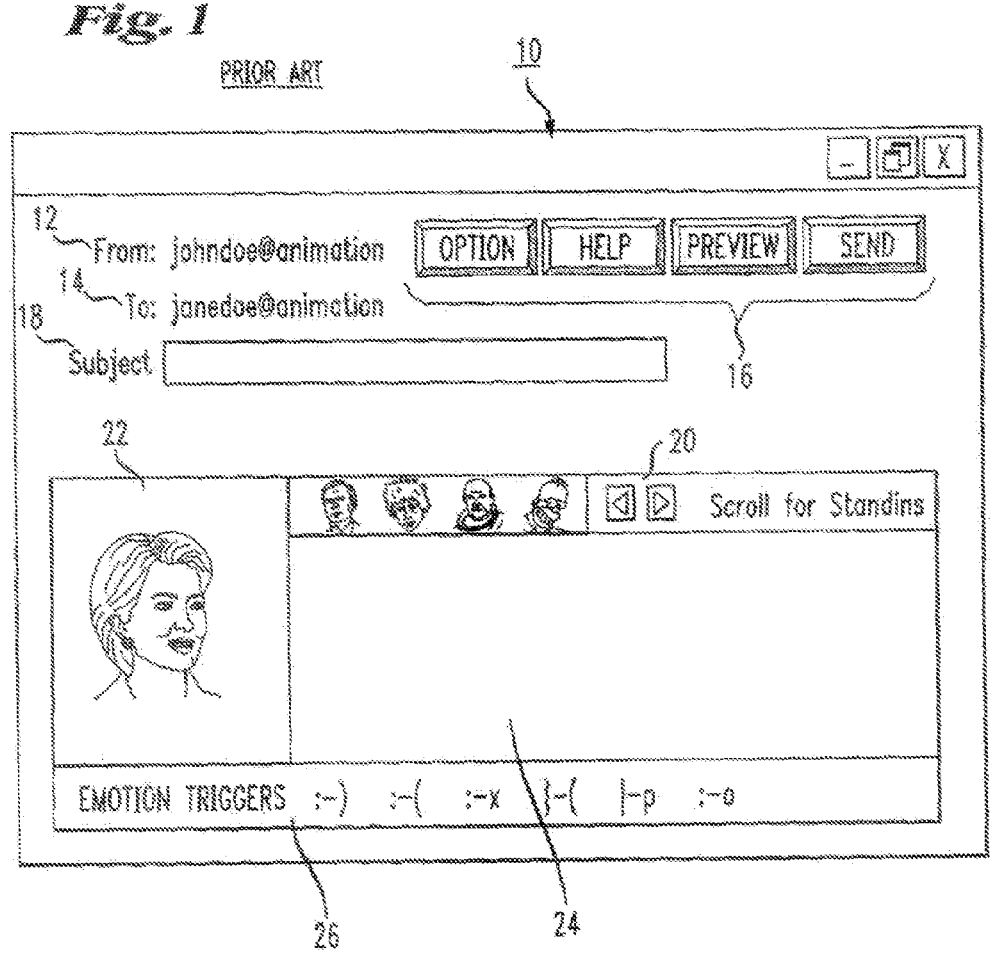
FIG. 1 illustrates a prior art window for creating a multi-media message.
Figure 2:
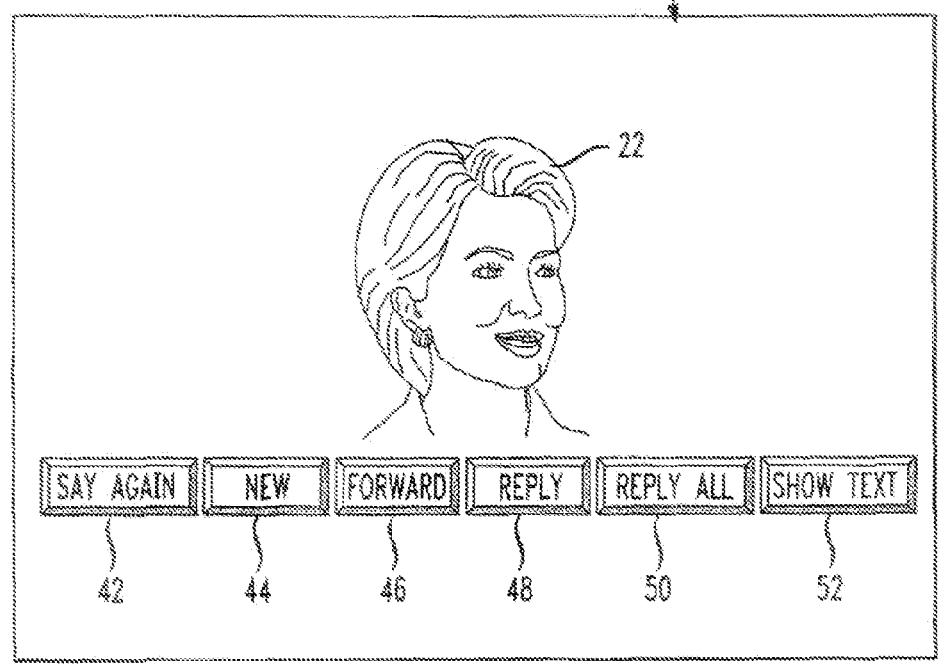
FIG. 2 illustrates a prior art window viewed by a recipient of a multi-media message.
Figure 3:
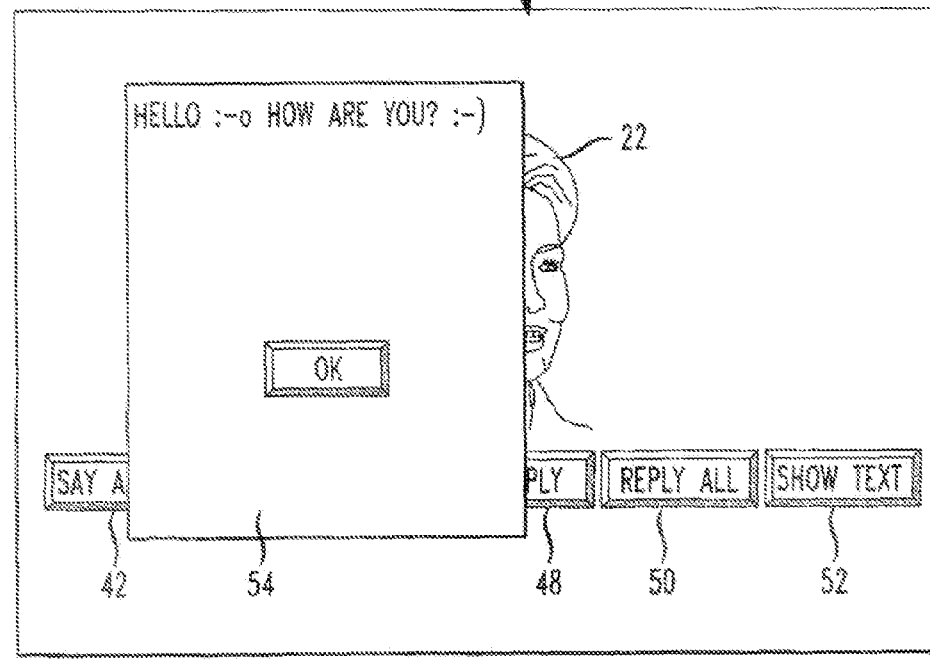
FIG. 3 illustrates a prior art window in response to a recipient of a multi-media message clicking on a "show text" button.

The present invention may be best understood with reference to the accompanying drawings and description herein. The basic system design supporting the various embodiments of the invention is first disclosed. A system comprises a TTS and an animation server to provide a multi-media message service over the Internet wherein a sender can create a multi-media message presentation delivered audibly by an animated entity.

FIG. 4(a) is an example high-bandwidth architecture 60 associated with the embodiments of the invention. The system 60 delivers a hyper-text mark-up language (HTML) page through the Internet 62 (connected to a web server, not shown but embodied in the Internet 62) to a client application 64. The HTML page (shown by way of example in FIG. 6) enables the sender to create a multi-media message. The client application may be, for example, a web browser such as Microsoft's Internet Explorer®. Other client applications include e-mail and instant messaging clients. The sender creates the multi-media message using the HTML page.

The web server receives the composed multi-media message, which includes several components that are additional to a regular e-mail or instant message. For example, a multi-media message includes a designation of an animated entity for audibly delivering the message and emotions that add emotional elements to the animated entity during the delivery of the message. The HTML page delivered to the client terminal enables the sender to manipulate various buttons and inputs to create the multi-media message.

Once the sender finishes creating the multi-media message and sends the message, the Internet 62 transmits the message text with emotions and other chosen parameters to a test-to-speech (TTS) server 66 that communicates with an animation or face server 68 to compute and synchronize the multi-media message. The transmission of the text-to-speech data may be accomplished using such methods as those disclosed in U.S. Pat. No. 6,173,250 B1 to Kenneth Jong, assigned to the assignee of the present invention. The contents of this patent are incorporated herein by reference.

The animation server 68 receives phonemes associated with the sender message and interpreted by the TTS server 66, including the text of the subject line and other text such as the name of the sender, as well as other defined parameters or data. The animation server 68 processes the received phonemes, message text, emoticons and any other provided parameters such as background images or audio and creates an animated message that matches the audio and the emoticons. An example method for producing the animated entity is disclosed in U.S. Pat. No. 5,995,119 to Cosatto et al. ("Cosatto et al."). The Cosatto et al. patent is assigned to the assignee of the present invention and its contents are incorporated herein by reference. Cosatto et al. disclose a system and method of generating animated characters that can "speak" or "talk" received text messages. Another reference for information on generating animated sequences of animated entities is found in U.S. Pat. No. 6,122,177 to Cosatto et al. ("Cosatto et al. II"). The contents of Cosatto et al. II are incorporated herein by reference as well.

The system 60 encodes the audio and video portions of the multi-media message for streaming through a streaming audio/video server 70. In a high-bandwidth version of the present invention, as shown in FIG. 4(a), the server 70 streams the multi-media message to the streaming client 72 over the Internet 62. One of ordinary skill in the art will understand and be cognizant of a variety of TTS servers and TTS technologies that may be optimally used for converting the text to speech. The particular implementation of TTS technologies is not relevant to the present invention. One of ordinary skill in the art will understand and be cognization of a variety of animation servers and animation technologies that may be optimally used for converting phonemes and emoticons into talking entities, preferably faces. The particular implementation of animation technologies is not relevant to the present invention.

FIG. 4(b) illustrates a low-bandwidth system 61 of the present invention. In this variation, the animation server 68 produces animation parameters that are synchronized with the audio produced from the TTS server 66. The audio and animation parameters are encoded and transmitted by the streaming server 74 over a lower bandwidth connection over the Internet 62. The streaming client 76 in this aspect of the invention differs from the streaming client 72 of FIG. 4(a) in that client 76 includes rendering software for rendering the animation on the client device using the streamed animation parameters provided from the streaming server 74. Furthermore, the client includes a TTS synthesizer that synthesizes the audio. In this manner, the systems disclosed in FIGS. 4(a) and 4(b) provide both a high-bandwidth and a low-bandwidth option for all users.

A further variation of the invention applies when the client device includes the animation or rendering software. In this case, the client device 72, 76 can receive a multi-media message e-mail, with the message declared as a specific multipurpose Internet mail extension (MIME) type, and render the animation locally without requiring access to a central server or streaming server 70, 74. In one aspect of the invention, the rendering software includes a TTS synthesizer with the usable voices. In this case, the recipient device 72, 76 receives the text (very little data) and the face model (several kb), unless it is already stored in a cache at the receiver device 72, 76. If the receiver device 72, 76 is requested to synthesize a voice different from the ones available at its TTS synthesizer, the server 74 downloads the new voice.

High quality voices typically require several megabytes of disk space. Therefore, if the voice is stored on a streaming server 74, in order to avoid the delay of the huge download, the server 74 uses a TTS synthesizer to create the audio. Then, the server 74 streams the audio and related markup information such as phonemes, stress, word-boundaries, bookmarks with emoticons, and related timestamps to the recipient. The recipient device 76 locally renders the face model using the face model and the markup information and synchronously plays the audio streamed from the server.

When the recipient receives an e-mail message associated with the multi-media message, the message is received on a client device 71 such as that shown in FIG. 5. FIG. 5 illustrates a different view of system 60. The client device may be any one of a desktop, laptop computer, a wireless device such as a cell phone, 3Com's palmpilot® or personal data assistant and the like. The particular arrangement of the client device 71 is unimportant to the present invention. The multi-media message may be delivered over the Internet, via a wireless communication system such as a cellular communication system or via a satellite communication system.

The multi-media message delivery mechanism is also not limited to an e-mail system. For example, other popular forms of communication include instant messaging, bulletin boards, I Seek You (ICQ) and other messaging services. Instant messaging and the like differ from regular e-mail in that its primary focus is immediate end-user delivery. In this sense, the sender and recipient essentially become interchangeable because the messages are communicated back and forth in real time. Presence information for a user with an open session to a well-known multi-user system enables friends and colleagues to instantly communicate message back and forth. Those of skill in the art known various architectures for simple instant messaging and presence awareness/notification. Since the particular embodiment of the instant message, bulletin board, or I Seek You (ICQ) or other messaging service is not relevant to the general principles of the present invention, no further details are provided here. Those of skill in the art will understand and be able to apply the principles disclosed herein to the particular communication application. Although the best mode and preferred embodiment of the invention relates to the e-mail context, the multi-media messages may be created and delivered via any messaging context.

For instant messaging, client sessions are established using a multicast group (more than 2 participants) or unicast (2 participants). As part of the session description, each participant specifies the animated entity representing him. Each participant loads the animated entity of the other participants. When a participant sends a message as described for the e-mail application, this message is sent to a central server that animates the entity for the other participants to view or streams appropriate parameters (audio/animation parameters or audio/video or text/animation parameters or just text) to the participants that their client software uses to render the animated entity.

Further as shown in FIG. 5, when a client device 71 receives a request from the recipient to view a multi-media message, the client device 71 sends a hypertext transfer protocol (HTTP) message to the web server 63. As a response, the web server 63 sends a message with an appropriate MIME type pointing to the server 70 at which point the server 70 streams the multi-media message to the client terminal for viewing and listening. This operation is well known to those of skill in the art.

In an alternate aspect of the invention, the client device 71 stores previously downloaded specific rendering software for delivering multi-media messages. As discussed above, LifeFX™ requires the recipient to download its client software before the recipient may view the message. Therefore, some of the functionality of the present invention is applied in the context of the client terminal 71 containing the necessary software for delivering the multi-media message. In this case, the animation server 68 and TTS server 66 create and synchronize the multi-media message for delivery. The multi-media message is then transmitted, preferably via e-mail, to the recipient. When the recipient opens the e-mail, an animated entity shown in the message delivery window delivers the message. The local client software runs to locally deliver the message using the animated entity.

Many web-based applications require client devices to download software on their machines, such as with the LifeFX™ system. As mentioned above, problems exist with this requirement since customers in general are reluctant and rightfully suspicious about downloading software over the Internet because of the well-known security problems such as virus contamination, trojan horses, zombies, etc. New software installations often cause problems with the existing software or hardware on the client device. Further, many users do not have the expertise to run the installation process if it gets even slightly complicated e.g., asking about system properties, directories, etc. Further, downloading and installing software takes time. These negative considerations may prevent hesitant users from downloading the software and using the service.

Some Java-based applications are proposed as a solution for the abovementioned problems but these are more restrictive due to security precautions and can't be used to implement all applications and there is no unified Java implementation. Therefore, users need to configure their browsers to allow Java-based program execution. As with the problems discussed above, a time-consuming download of the Java executable for each use by users who do not know if they really need or like to use the new application may prevent users from bothering with the Java-based software.

Accordingly, an aspect of the present invention includes using streaming video to demonstrate the use of a new software application. Enabling the user to preview the use of a new software application solves the above-mentioned problems for many applications. Currently, almost all client machines have a streaming video client such as Microsoft's Mediaplayer® or Real Player®. If not, such applications can be downloaded and configured with confidence. Note that the user needs to do this only once. These streaming video receivers can be used to receive and playback video on the client's machine.

According to this aspect of the present invention, shown by way of example in FIG. 5, a user may wish to preview a multi-media message before downloading rendering software on the client device 71. If such is the case, the user enters into a dialogue with the streaming server 70 and requests a preview or demonstration of the capabilities of the application if the rendering software were downloaded. The streaming server 70 transmits to the client device 71 a multi-media message showing dynamic screen shots of the application as if it is running on the user's machine. As an example, if the new application would have the capability to show a three-dimensional view of a room based on vector graphics, the streaming video displays the three-dimensional output of the application on the user's monitor as video. Most existing players allow the users to control the video playback by clicking on buttons or the like on an HTML page. This provides an interactive feeling for the user if needed without loading any new or suspicious software.

Therefore, an aspect of the present invention enables the user, before downloading rendering software for presenting multi-media messages using an animated entity, to request a preview of the multi-media message streamed to the client as a video and presented on a player such as the Microsoft's Mediaplayer® or Real Player®. If the user so desires, he or she can then download the rendering software for enjoying the reception of multi-media messages.

Figure 6:
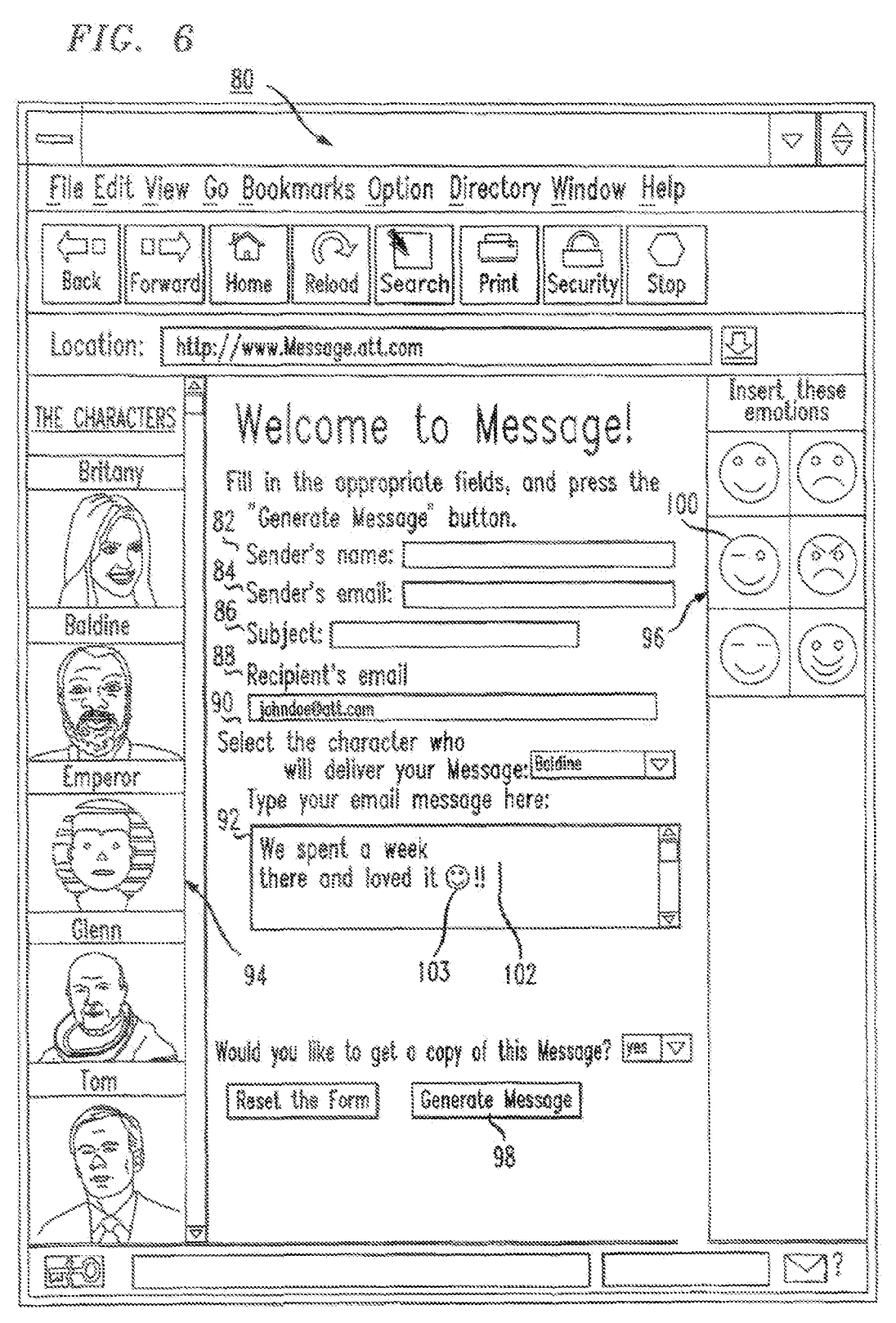

FIG. 6 shows an example of a template for the sender to use to create a multi-media message. A message-creation window 80 includes basic e-mail-related features such as fields for inserting a sender name 82 and sender e-mail address 84. A subject line 86 and recipient address field 88 are also provided. The sender enters the text of the message within a standard text field 92. Various animated entities 94 are available from which the sender may choose (90) for delivering the message. Typically the animated entities are faces as shown in FIG. 6, but they may be any entity such as an animal, car, tree, robot, or anything that may be animated.

The sender may also insert emotions 103 into the text of the message. The system includes predefined emotions 96, such as ":-)" for a smile, "::-)" for a head nod, "*w*" for an eye wink, and so forth. The predefined emotions are represented either as icons or as text, such as ";-)". As shown in FIG. 6, the window 80 includes a sample group of emoticon icons 96. The sender inserts an emoticon into a text message at the location of the cursor 102 by clicking on one of the emoticon icons 100. The sender may also type in the desired emoticon as text. Emoticon icons 96 save the sender from needing to type three keys, such as ":" and "-" and ")" for a smile. The icons 96 may be either a picture of, say, a winking eye or a icon representation of the characters ";-)" 100, or other information indicating to the sender that clicking on that emoticon icon will insert the associated emoticon 103 into the text at the location of the cursor 102.

Once the sender composes the text of the message, chooses an animated entity 94, and inserts the desired emoticons 103, he or she generates the multi-media message by clicking on the generate message button 98. The animation server 68 creates an animated video of the selected animated entity 94 for audibly delivering the message. The TTS server 66 converts the text to speech as mentioned above. Emoticons 103 in the message are translated into their corresponding facial expressions such as smiles and nods. The position of an emoticon 103 in the text determines when the facial expression is executed during delivery of the message.

Execution of a particular expression preferably occurs before the specific location of the emoticon in the text. This is in contrast to the LifeFX™ system, discussed above, in which the execution of the smile emoticon in the text "Hello, Jonathan :-) how are you?" starts and ends between the words "Jonathan" and "how". In the present invention, the expression of the emotion begins a predefined number of words or a predefined time before the emoticon's location in the test. Furthermore, the end of the expressions of an emoticon may be a predefined number of words after the location of the emotion in the text or a predetermined amount of time after the location of the emotion.

For example, according to an aspect of the present invention, the smile in the sentence "Hello, Jonathan :-) how are you?" will begin after the word "Hello" and continue through the word "how" or even through the entire sentence. The animated entity in this case will be smiling while delivering most of the message — which is more natural for the recipient than having the animated entity pause while executing an expression.

Furthermore, the starting and stopping points for executing expressions will vary depending on the expression. For example, a wink typically takes a very short amount of time to perform whereas a smile may last longer. Therefore, the starting and stopping points for a wink may be defined in terms of 0.1 seconds before its location in the text to 0.5 seconds after the location of the wink emoticon in the text. In contrast, the smile emoticon's starting, stopping, and duration parameters may be defined in terms of the words surrounding the emoticons.

An embodiment of the present invention relates to a system and method of enabling a sender to customize an animated entity for use in delivering a multi-media message. In this aspect of the invention, the sender may be able to choose his or her own face or submit another face or other kind of object and use a customization tool preferably over the Internet to be able to use the customized animated entity for delivering multi-media messages.

Figure 7:
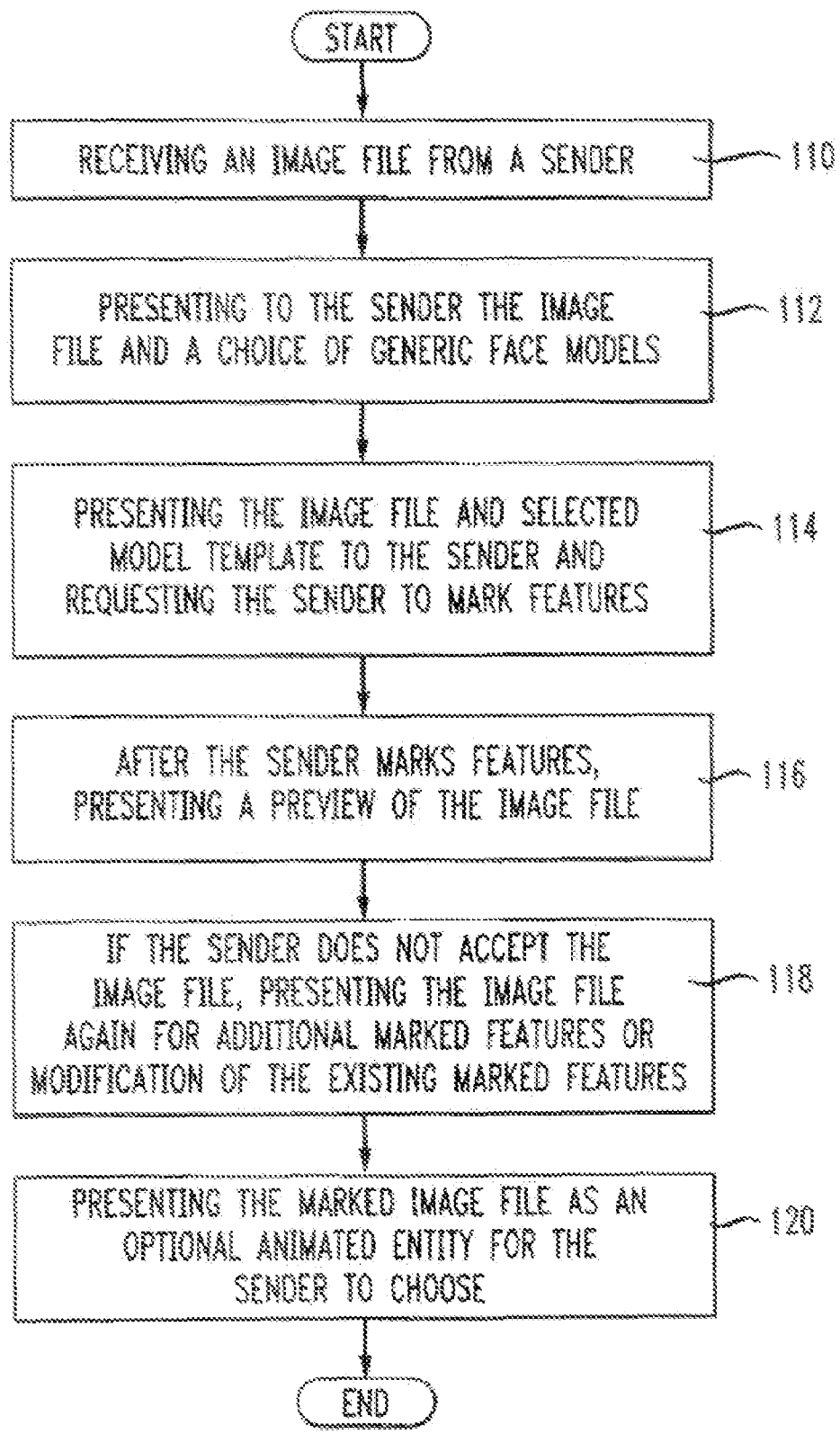
FIG. 7 illustrates an exemplary method for enabling a sender to submit an image model for use as an animated entity.

The method is illustrated by way of example in FIG. 7. The method involves using a server, such as the web server 62, to receive from the sender an image (110) of an entity to be used as an animated entity. Preferably the server receives the sender image over the Internet but any other manner of sending an image may be used. The image may be in any number of coded standards such as JPEG, JPEG-2000, GIF or MPEG-1/2/4. Once the server receives the image, a dialogue between the sender and the server occurs. The submitted sender image and an option to choose from a plurality of generic face models are presented to the sender (112). The generic face model provides a guide to the sender when he or she marks points on the image to be used as the animated entity. The server guides the sender through a series of questions wherein the server requests the sender to mark a plurality of facial features on the entity (114) using the selected generic face model template as a guide. Preferably, requesting the sender to mark features on the image file further comprises instructing the sender to mark points on the image file by indicating a specific point to mark on the chosen generic model template. In this manner, the user will create a personal animated entity that will be presented as a selectable animated entity when creating a multi-media message.

The server may choose to analyze the submitted sender image and provide the user with a set of points already marked on the image. In this case, the user will see the name like 'leaf mouth corner' of the feature point as soon as he moves his mouse point over a feature point. Then the user has the option of shifting the feature point to a refined position. Furthermore, the user has the option to add more points. In a further variation to the server presenting marked points, the server might show lines indicating its knowledge about a facial feature. These lines outline the facial features like lips, nose, eyes, eyebrows similar to the lines drawn in a caricature or by a cartoonist. A dialogue proceeds between the server and the user where the user approves of the indicated lines or is allowed to modify and adjust the lines as desired. In this manner, the interaction between the user and the server easily enables the user to create a personal animated entity for use in multi-media messages.

In case the face is very small on the image, the server enables the user to zoom into the image. In this manner, the server provides the user a larger image on which to mark specific points. There are several advantages to enabling the user to zoom the image file when marking points for the animated entity. For example, the user can, with greater precision, mark the appropriate locations on the image file. The zoomed image file can also be presented, at the time of creating the multi-media message, as a selectable background image with the larger animated entity. Many scanned images may be of a person with some background scenery. The user may wish to use the background scenery from, for example, a vacation picture used as the image file. Thus, enabling the user to zoom the image file provides greater flexibility in the use of both the prepared animated entity as well as the background information on the image file.

Figure 8:
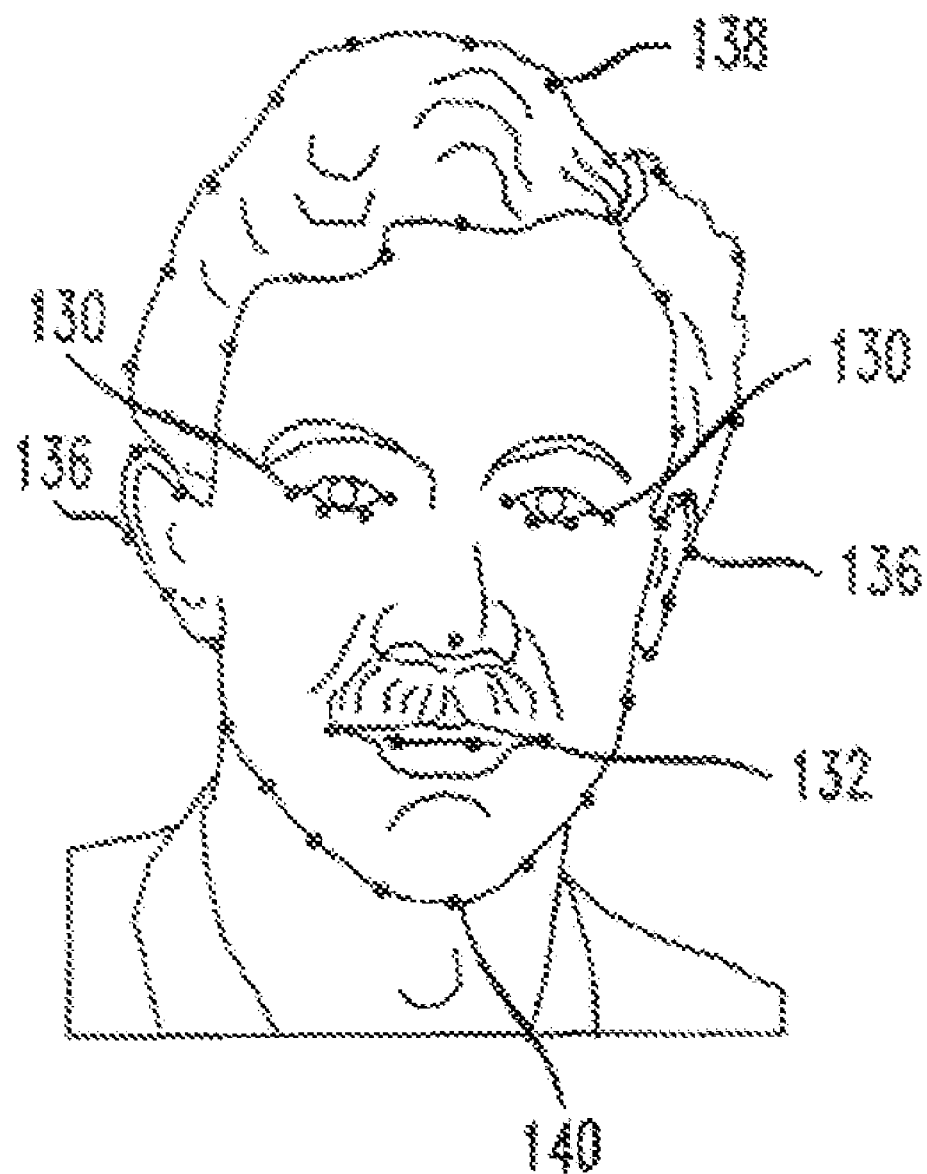
FIG. 8 illustrates an image model marked by a sender for preparation of the model's use as an animated entity in multi-media messages.
Figure 9:
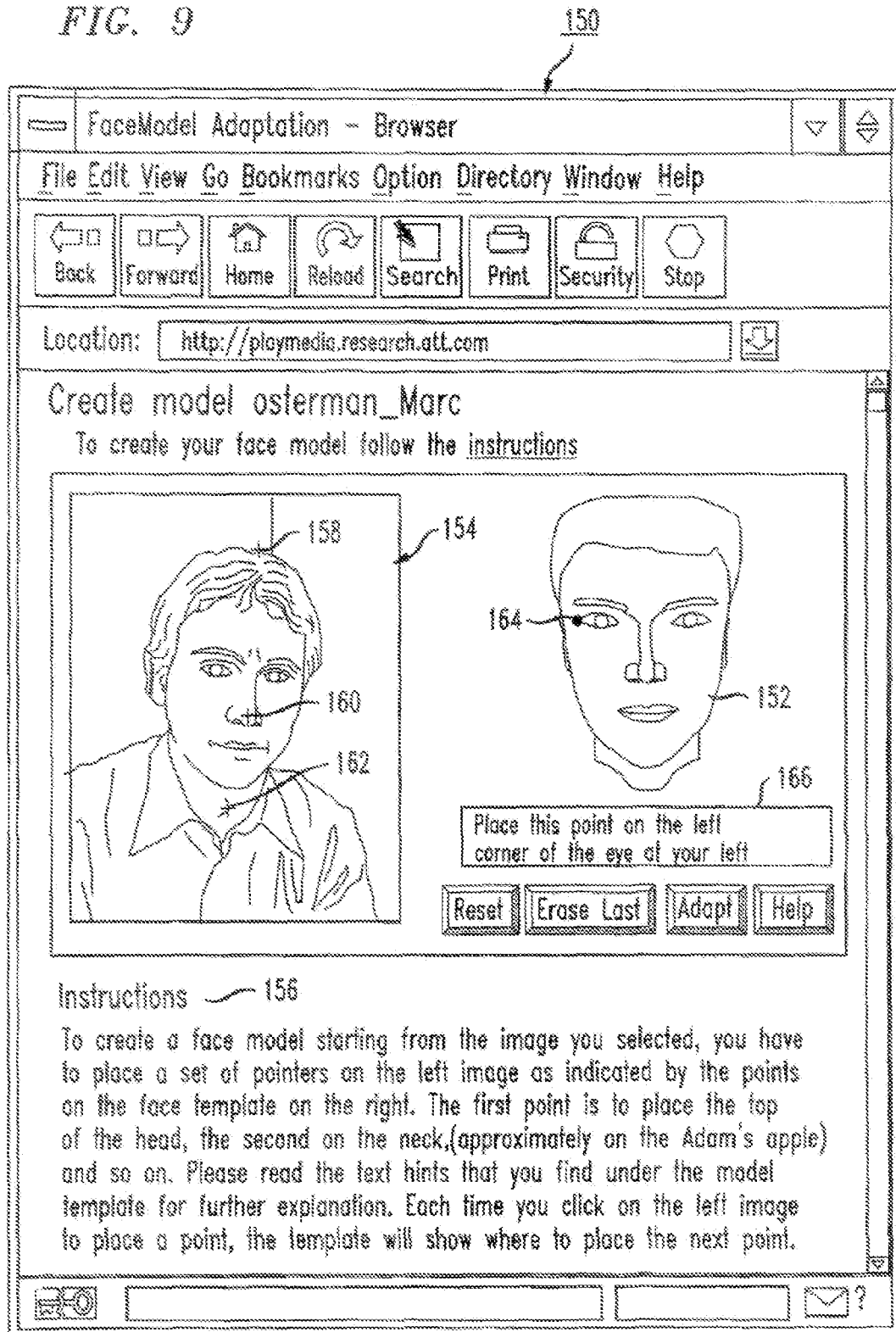
FIG. 9 shows an example window used for enabling a sender to customize an image for use in delivering multi-media messages.

Marking features may be accomplished in a manner shown in FIGS. 8-9. FIG. 8 illustrates features points some of which at least need to be marked on an image by the sender to create a customized image. Some of the feature points include eye feature points 130, mouth feature points 132, ear feature points 136, head outline feature points 138 and a chin feature point 140. Other feature points are shown but not specifically referenced in FIG. 8.

When a user submits an image to the server for face model creation, the server prefers an image with an upright frontal face and closed mouth. The face model adaptation algorithms use interpolation functions like radial basis functions to adapt those vertices of a face model that are not adapted explicitly by defining a correspondence. These basis functions implement linear adaptation that do not effectively describe a rotation of the face as it would be appropriate when dealing with a tilted head.

In order to address these limitations, the system enables the user to define a symmetry axis for the face. The rotation of the face may be defined in the image plane by computing the angle between the image boundaries and the imaginary line defined by the three point: chin, nose tip, and top of the head. This angle is used to rotate the face model prototype prior to adapting it to the image.

A second approach to these limitations deals with the out of image plane rotation of a face image. Assuming that the image plane is the x-y plane, out of image plane rotation means rotation around the x and/or y axis. The present invention includes two approaches for rotating the model prototype prior to adaptation: The user will be able to rotate the prototype using the mouse, sliders, or wheels, such that its orientation coincides with the face in the image. Alternatively, the server computes the rotation of the face around the neck in the image assuming that the face is symmetrical. Using the locations of supposedly symmetric feature points like left and right eye, left and right mouth corners, and tip of the nose, the rotation angle may be computed.

In order to enable the use of face images with open mouths, the server provides special treatment for those points that define the inner lip contour of the open mouth. In a first step, the server defines the mouth axis as the line that connects the left and right inner lip contour edges. Then the user marks the inner lip contour on the image following the sequence of points given by the face adaptation program. The Euclidian distance between points on the inner lip contour and the mouth axis is set to 0 when deforming the face model prototype. This way ,the model gets deformed according to the positioned feature points, but it does not open its mouth. However, when defining the texture coordinates of the face model, the server considers the distance between a feature point and the mouth axis. In this way, the texture of the opened lips gets mapped onto the closed lips of the adapted face model — as it is done when a face model is created from an image with closed mouth.

When face models are created from images with closed mouths, the server defines the texture and color of the mouth interior, teeth, and tongue using predefined texture maps. In order to accommodate black and white images as well as effects, the server enables the user to select the color of these texture maps. The system prefers grey and white colors for tongue and teeth of models created from black and white images, respectively.

One entertaining application of the present invention is to create animated characters that are not human-like. This includes animals like cars and dogs or cars. Deforming a human head model prototype to accommodate these models sometimes results in models that do not perform appropriately. The server in these cases provides several templates for the user to choose from when he or she starts defining a new face model. These templates may include a template for dogs, cats, plates, cups, cars or a face with a body.

For some animations, it is desirable to preserve the face in the contact of the image. The present invention includes an option where the face model is rendered such that it appears to be talking within the image. This is achieved by scaling and positioning the face model, as defined in the image, during model adaptation. The server receives from the user an image file with an entity and background information. As described elsewhere herein, the user is requested to mark the entity points for creating the personal animated entity. When the goal is to deliver the multi-media message using a personal animated entity in the context of the background of the image file, several problems arise; due to head motion, there might be background uncovered for which the system does not have the appropriate texture. The transitions between the face model and the image might become visible. As far as the uncovered background is concerned, the server extrapolates the image signal into this uncovered area using a method based on POCS (Projection onto Convex Sets) or signal repetition as used in MEPG-4. Face model boundaries are smoothed by blending the pels of the face model with the pels of the image with a strip of one or 2 pels around the face model boundary.

According to one aspect of the invention, treating the uncovered background problem comprises rendering the animated entity over the background image where the background image includes the animated entity. In this case, the rotation of the animated entity reveals some uncovered background that is incorrectly filled with the texture of the animated entity prior to rotation. As an example, this would mean that the hair of an animated face/head would be visible in the uncovered background. If head rotation is limited to small angles, let's say 5 degrees, this is barely noticeable.

Once the user previews and approves the personal animated entity within the context of the background image, the animated entity and/or image file can be presented to the sender as a selectable option for delivering the message. The sender may also be given the option to either choose just the animated entity without the image file background information or to include the background information. This provides greater flexibility to the sender in fashioning the multi-media message.

In order to adapt a face model to an image, the server defines a certain number of correspondences between the face model and the image. The server requires the user to define correspondences for n points. At this point, the server enables the user to adapt the model. The server provides feedback by delivering several images with predefined facial expressions like joy, anger, . . . In case the user is not satisfied with the result, the server allows the user to shift the point correspondences already defined and to add new correspondences. These new correspondences may be for feature points as defined by the server (hence the user only marks the points on the image) or for feature points that the user defines on the face model and the image.

Sometimes, users want to create a face model from an image that is too big for the purpose. The server provides simple web-based image processing tools that enable to crop part of an image defining a rectangle with the remaining image. For small images, the server provides automatic enlargement or zooming of the image to match the size of the face model prototype. This enables the user to clearly mark the required number of feature points on the image. More discussion regarding zooming and selection of backgrounds from image files is provided below.

FIG. 9 shows an example of requesting the sender to mark a plurality of feature points. A window 150 presents to the sender a copy of the received image 154 and a representative of a generic face 152. Instructions are provided at various locations 156, 166 for guiding the sender through the process of marking the image 154 as needed. Main feature points such as the top of the head 158, the tip of the nose 160 and the throat 162 are indicated by the sender using a mouse click on the location which deposits a dot or some other indicator to mark the spot. As the instructions 156, 166 proceed, the sender is told to mark various feature points on the image 154 that correspond to changing marks on the generic face 152. For example, to instruct the sender to mark an eye in the outside corner of the eye, a dot 164 is positioned on the generic face 152 and the sender clicks on the image 154 to mark the corresponding spot. In order to aid defining points in 154, a verbal description of its location is given in 166. This helps the user to create models of objects that do not closely resemble a human face.

Returning to the method illustrated in FIG. 7, the next step comprises, after the sender marks the image and the server receives the facial features marked by the sender, presenting the sender with a preview of at least one expression associated with the marked image file (116). If necessary, and after the sender previews the image file, the image file may be presented again to the sender for further additional points or to change any markings (118). Once all the features are marked by the sender and received by the server, the method comprises presenting the image file as an optional animated entity when the sender chooses an animated entity for delivering a multi-media message (120).

The presentation of the personal animated entity as a selectable animated entity for the multi-media message may also include a further presentation to the sender of the background of the image file used to create the personal animated entity. In this context, the user may have three choices of selecting the animated entity: (1) An animated entity having a predefined background, in which case the animated entity is automatically scaled to fill the frame of the window in which it is presented; (2) An animated entity with the image as background from which it was created, in which case the animated entity has exactly the same size as in the image; (3) If the user chooses to zoom the image, an animated entity using the zoomed image as the background, hence presenting the animated entity with the size as given in the zoomed image. Other variations on these choices may also be available depending on the arrangement of the image file and the animated entity.

A threshold number of points must be input before an animated entity can be generated. Therefore, the request for marking points may only last until a predetermined number of points is generated after which further points may be added for increased animation effect at the option of the sender. Preferably, once the sender has entered in the predetermined number of points, a dialogue occurs between the server and the sender wherein the sender is presented with an option to continue to mark feature points to improve the presentation of the animated entity. If the sender chooses to continue to mark points, further points are shown on the generic model for the sender to mark corresponding points on the image file. A maximum number of points may be reached at which time the system will no longer accept marked feature points from the sender.

Previews may be presented to the sender at various times throughout the process. For example, the sender may be able to request a preview at any point after the successful reception by the server of the predetermined minimum number of feature points. Therefore, the sender may enter in a number of points preferably equal to or more than the minimum and up to the maximum number of feature points.

The image file sent to the server by the sender includes associated information such as a sender-assigned name, gender, category, a default voice and indexing information. This data enables the server to organize and catalogue and prepare the image file for use. In one aspect of the invention, the category information relates to whether the animated entity will be generally available to other uses or only available to the sender. The indexing information may relate to enabling the animated entity to be in a searchable database. The gender is used to define the default gender of the speech for the animated entity.

Further options are also available to the sender. For example, in an aspect of the invention, the server presents options to the sender to choose teeth textures or design, eye color or shape, aging effects (older or younger), weight of the animated entity, a voice and a tongue. When the sender chooses any of these additional options, they are incorporated into the animated entity and delivered as part of the animated entity when multi-media messages are being presented to the recipient. For example, each image submitted by the sender may have a default voice associated with it. However, the sender may be presented with an option to either select a voice if no default is provided, or to modify or change the default voice. If the sender selects a particular voice, then the selected voice is used when the multi-media message is delivered to the recipient.

The server adds facial features that are usually not visible in the image such as teeth and a tongue. In order to seamlessly integrate the texture of the added teeth and tongue into the model created from the image, the color space of the image is analyzed. The result of the analysis determines the final color and texture of the teeth and tongue. For example, assuming an HSV (Hue, Saturation, Value) color space, the color of the lower lip is used as a reference color. In this case, the HSV parameters of the tongue is set to the same hue, a slightly light S and a lower V, resulting in a tongue that is darker than the lips (since it is inside the mouth) but the same color. This color adaptation may be turned off if the color of the lips is outside the natural color range. This will avoid lipstick causing an unnatural colored tongue. The parameters for determining the change of V and S are measured from pictures of several people with an open mouth.

In a simple approach with a black and white image, the system assigns gray to the tongue and a white-gray color and texture to the teeth. Otherwise the system assigns a color to the tongue. In one aspect of the invention, the system requests the user to select whether the image is black and white or color.

Using all the received information and choices provided by the sender, the server computes a customized model associated with that entity which may be added to the sender's listing of potential animated entities from which to choice. In this manner, the customized model is stored either on the server or elsewhere in a private database for restricted access by the sender.

Variations on this embodiment of the invention include the server, after computing the customized model associated with entity, displaying at least one facial expression to the sender of the customized model. By displaying facial expressions to the sender after the sender has marked features points, the sender may get a sense for how well the feature points were marked on the image 152. The display of facial features may include static pictures of specific expressions or may include presenting a proof-animated entity to the sender based on the customized model.

The sender may approve or redo the feature points via a dialogue session with the server. Another aspect of the invention includes the server, after displaying at least one facial expression to the sender of the customized model, presenting the sender with an option to change a magnitude associated with each displayed facial expression.

Figure 10:
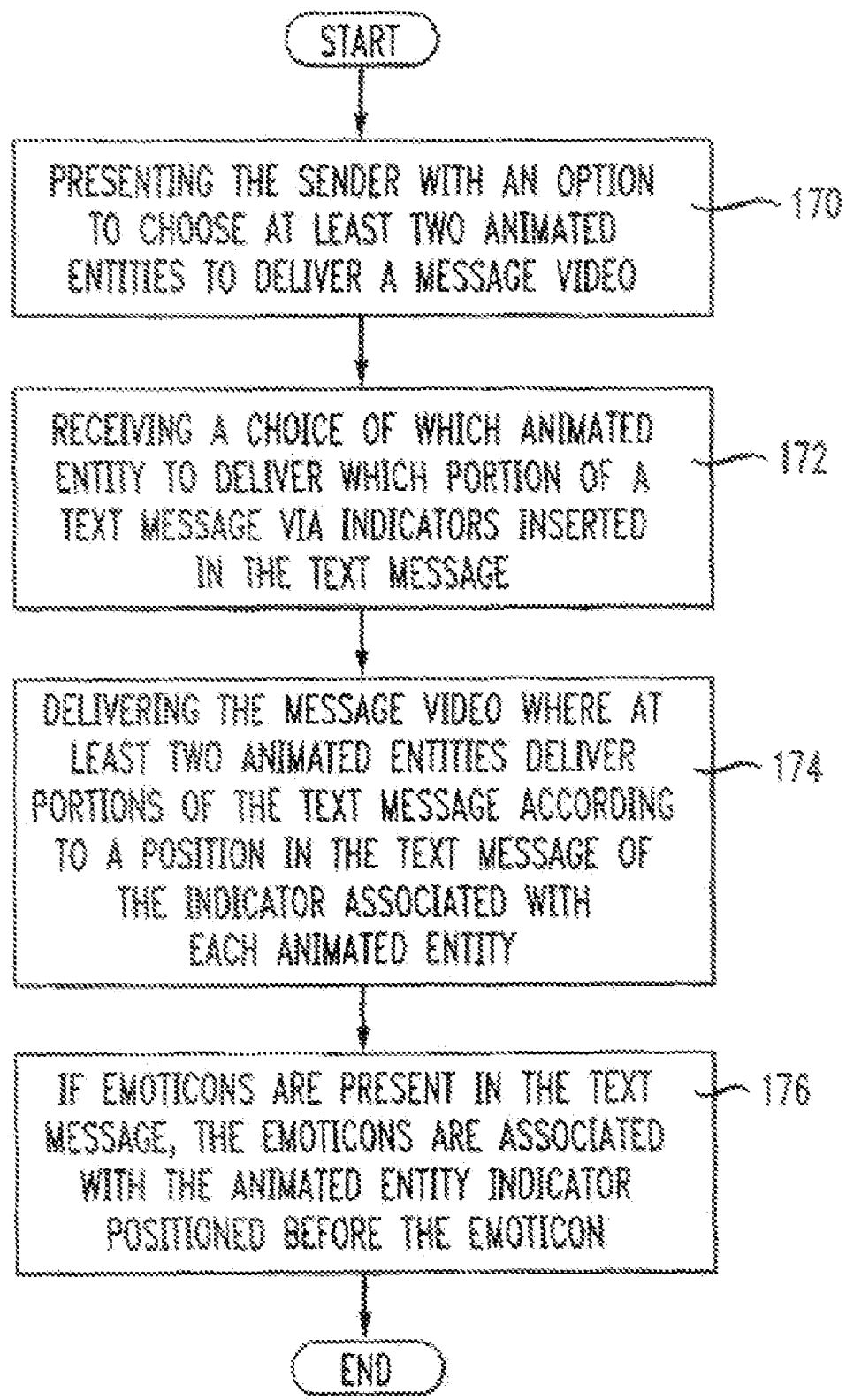
FIG. 10 shows an example of a method of enabling a sender to select more than one animated entity to deliver a multi-media message.

Another embodiment of the invention is shown in FIG. 10. The flow-chart of FIG. 10 illustrates an example of a method for enabling a sender to create a multi-media message to be delivered by at least two animated entities. The method relates to enabling a sender to create a multi-media message to a recipient, the multi-media message comprising a dialogue between at least two animated entities arranged to deliver respective portions of a text message from the sender. The method comprises presenting the sender with an option to choose at least two animated entities to deliver respective portions of a text message to the recipient, the choice of which animated entity to deliver which portion of the text message being effected by the insertion in the text message of an indicator associated with the chosen animated entity (170). The system receives the choice from the sender of which portions of the text message are to be delivered by which of the chosen animated entities (172). The multi-media message is delivered using the chosen animated entities in respective portions of the text message according to a position in the text message of the indicator associated with the animated entity (174).

Emoticons may also be present in the text of the message. Preferably, the emoticons are associated with the previously indicated animated entity (176). For example, if there are two animated entities chosen, "1" and "2", in the text of the message, a tag such as, for example <<face 1>> is inserted indicating have "face 1" deliver the message. Any of the following emoticons in the text are displayed by face 1. Then, after a paragraph or two, assume that another tag such as <<face>> is inserted into the text illustrating that another face, "2", should deliver the rest of the message. In that case, all the emoticons in the message following the face 2 tag should be displayed by face 2.

In this manner, the sender may be able to create "acts" where different emoticons deliver different portions of the message and even seem to carry on a dialogue with each other. Such multi-media presentations enhance the recipient's overall experience in view the multi-media message.

The multi-media message may comprise a dialogue between at least two animated entities arranged to deliver respective portions of a text message from the sender. In this aspect of the invention, the method comprises receiving from the sender a text message comprising an indicator of a first animated entity and text associated with the first animated entity, and an indicator of a second animated entity and text associated with the second animated entity, and delivering the multi-media message wherein the first animated entity delivers the text associated with the first animated entity and wherein the second animated entity delivers the text associated with the second animated entity.

Although the above description may contain specific details, they should not be construed as limiting the claims in any way. Other configurations of the described embodiments of the invention are part of the scope of this invention. For example, the present invention appears to apply most to e-mail applications. However, now such features as instant messaging are also available and the concepts of the present invention may be easily incorporated in to competing technology. Accordingly, the appended claims and their legal equivalents should only define the invention, rather than any specific examples given.

We claim:

1. A method for creating a personal animated entity for delivering a multi-media email message from a sender to a recipient, the method comprising:

receiving from the sender a personal image file at a server, the image file including an image of an entity;

via a dialog between the server and the sender, requesting the sender to provide input with respect to a plurality of facial features of the image of the entity in preparation for animating the image of the entity, wherein the dialog includes, after the sender has input a predetermined number of facial features, presenting the sender with an option to continue to mark facial features:

after the sender provides the input with respect to the plurality of facial features of the image of the entity, presenting the image of the entity as a personal animated entity to the sender to preview; and upon approval of the preview from the sender, as the sender later begins a process of preparing a multi-media email message to send to the recipient, presenting the image of the entity as a sender-selectable personal animated entity for delivering the multi-media email message to the recipient.

2. The method of claim 1, wherein upon approval of the preview from the sender, presenting a plurality of images of entities including the sender-selectable personal animated entity for delivering the multi-media email message to the recipient, the method further comprising:

receiving, from the sender, a selection of one of the presented plurality of images of the entities as an animated entity for delivering the multi-media email message.

3. The method of claim 1, wherein the image file further includes a background, the method further comprising:

presenting the sender with an option to include the background from the image file with the personal animated entity when the multi-media email message is delivered to the recipient.

4. The method of claim 1, wherein the image file further includes a background, the method further comprising:

delivering the multi-media email message to the recipient such that the personal animated entity delivers the multi-media email message with the background from the image file as a background.

5. The method of claim 4, further comprising:

blending the animated entity and an uncovered background region when the personal animated entity moves during the delivering of the multi-media email message to the recipient.

6. The method of claim 4, further comprising:

smoothing boundaries of the personal animated entity by blending pels of the personal animated entity with pels of the background.

7. The method of claim 4, further comprising:

extrapolating an image signal into uncovered background areas due to movement of the personal animated entity during the delivering of the multi-media email message.

8. The method of claim 7, wherein the extrapolating includes using a method based on projection onto convex sets.

9. The method of claim 7, wherein the extrapolating includes using signal repetition.

10. The method of claim 1, further comprising:

selecting, by the sender, one of a plurality of animated entities including the personal animated entity created by the sender;

selecting, by the sender, a voice for the selected one of the animated entities;

delivering the multi-media email message to the recipient using the selected one of the animated entities and the selected voice.

11. The method of claim 10, further comprising:

modifying, by the sender, the voice of the selected animated entity; and delivering the multi-media message to the recipient using the selected one of the animated entities and the modified voice.

12. The method of claim 10, further comprising:

selecting, by the sender, an image to use as a background image; and delivering the multi-media message to the recipient using the selected one of the animated entities, wherein the selected one of the entities appears to be included as part of the background image when delivering the multi-media message.

13. The method of claim 11, wherein the dialog with the user further elicits input from the user regarding a symmetry axis for the entity.

* * * * *